United States Patent [19]

Ederyd et al.

[11] Patent Number: 5,619,000

[45] Date of Patent: Apr. 8, 1997

[54] METHOD OF MAKING CEMENTED CARBIDE ARTICLES AND THE RESULTING ARTICLES

[75] Inventors: Stefan Ederyd, Saltsjö-Boo; Jan Åkerman, Stockholm, both of Sweden; Robert Beaufoy, Coventry; Michael Carpenter, Nuneaton, both of England; Maxime Bonneau, Le Fontanil; Jacques Pillot, La Tronche, both of France

[73] Assignees: Sandvik AB, Sandviken, Sweden; Eurotungstene Poudres S.A., Grenoble, France

[21] Appl. No.: 499,181

[22] Filed: Jul. 6, 1995

Related U.S. Application Data

[62] Division of Ser. No. 866,494, Apr. 10, 1992, Pat. No. 5,441,693.

[30] Foreign Application Priority Data

Apr. 10, 1991 [SE] Sweden .................................. 9101078
May 23, 1991 [FR] France .................................. 91 06211

[51] Int. Cl.$^6$ .................................................. C22C 29/08
[52] U.S. Cl. .................................................. 75/240; 75/242
[58] Field of Search .................................. 75/240, 242

[56] References Cited

U.S. PATENT DOCUMENTS

| | | | |
|---|---|---|---|
| 3,215,510 | 11/1965 | Kelly et al. | 75/240 |
| 3,532,493 | 7/1969 | Chay | 419/18 |
| 3,674,443 | 7/1972 | Daniels | 75/236 |
| 4,013,460 | 3/1977 | Brown et al. | 419/15 |
| 4,145,213 | 3/1979 | Oskarsson et al. | 75/238 |
| 4,150,984 | 4/1979 | Tanaka et al. | 75/238 |
| 4,225,344 | 9/1980 | Fujimori et al. | 75/203 |
| 4,329,169 | 5/1982 | Gingerich et al. | 75/365 |
| 4,539,041 | 9/1985 | Figlarz et al. | 420/435 |
| 4,596,746 | 6/1986 | Morishita et al. | 428/458 |
| 4,743,515 | 5/1988 | Fischer et al. | 428/698 |
| 4,904,445 | 2/1990 | Iyori et al. | 419/13 |
| 5,151,247 | 9/1992 | Haglund et al. | 419/13 |

FOREIGN PATENT DOCUMENTS 61-194148 8/1986 Japan .
62-287038 12/1987 Japan .

OTHER PUBLICATIONS

Roland S. Young, Ed., "Cobalt, Its Chemistry, Metallurgy, and Uses", Reinhold Publishing.

Michel Figlarz et al, "Preparation of Controlled Size Metal Powders in the Micronic and Sub–". . . .

F. Fievet et al, "Homogeneous and Heterogeneous Nucleations in the Polyol Process for the".

F. Fievet et al, "Preparing Monodisperse Metal Powders in Micrometer and Submicrometer".

*Primary Examiner*—Ngoclan Mai
*Attorney, Agent, or Firm*—Burns, Doane, Swecker & Mathis, L.L.P.

[57] ABSTRACT

The present invention relates to a method of producing a sintered body comprising one or more hard constituents and a binder phase based on cobalt, nickel and/or iron by powder metallurgical methods milling, pressing and sintering of powders. At least part of the binderphase powder consists of non-agglomerated particles of spheroidal morphology having dimensions of 0.1 to 20 μm.

7 Claims, No Drawings

METHOD OF MAKING CEMENTED CARBIDE ARTICLES AND THE RESULTING ARTICLES

This application is a divisional of application Ser. No. 07/866,494, filed Apr. 10, 1992 U.S. Pat. No. 5,441,693.

BACKGROUND OF THE INVENTION

The present invention relates to a method of making cemented carbide articles using binder phase powders with spherical, non-agglomerated particles.

Cemented carbide contains mainly tungsten carbide and cobalt, often along with certain other carbides, e.g., carbides of titanium, tantalum, niobium, chromium, etc. It contains at least one hard but brittle (carbide) phase and a relatively less hard but ductile and tough metal (binder) phase, particularly cobalt. This results in materials combining hardness and toughness which have found many applications, for instance in rock drilling and metal cutting tools, wear parts, etc.

Cemented carbide is made by techniques usual in powder metallurgy, that is:

mixing the constituent powders (carbides, cobalt and possibly other hard materials) by milling, using mills (rotating ball mills, vibrating mills, attritor mills, etc.) equipped with non-polluting milling media which themselves are made of cemented carbide. The milling is made in the presence of an organic liquid (for instance ethyl alcohol, acetone, etc.) and an organic binder (for instance paraffin, polyethylene glycol, etc.) in order to facilitate the subsequent granulation operation;

granulation of the milled mixture according to known techniques, in particular spray drying. The suspension containing the powdered materials mixed with the organic liquid and the organic binder is atomized through an appropriate nozzle in the drying tower where the small drops are instantaneously dried by a stream of hot gas, for instance, a stream of nitrogen. The granules collected at the lower end of the tower have an average diameter adjustable by the choice of appropriate nozzles, between 100 and 200 μm. Such granules flow easily, in contrast to fine or ultra-fine powders. The formation of granules is necessary in particular for the automatic feeding of compacting tools used in the subsequent stage;

compaction of the granulated powder in a matrix with punches (uniaxial compaction) or in a bag (isostatic compaction), in order to give the material the shape and dimensions as close as possible (considering shrinkage) to the dimension wished for the final body. If necessary, the compacted body can be subjected to a machining operation before sintering; and sintering of the compacted bodies at a temperature and for a time sufficient to obtain dense bodies with a suitable structural homogeneity.

The sintering can equally be carried out at high gas pressure (hot isostatic pressing), or the sintering can be complemented by a sintering treatment under moderate gas pressure (process generally known as SINTER-HIP).

The sintered cemented carbides can be characterized in particular by their porosity and their microstructure (observed by optical or electron microscopy).

The cobalt powders conventionally used in the cemented carbide industry are obtained by calcining cobalt hydroxide or oxalate followed by a reduction of the oxide so obtained by hydrogen; see for instance, "Cobalt, its Chemistry, Metallurgy and Uses", R. S. Young Ed., Reinhold Publishing Corporation (1960) pages 58–59. These conventional cobalt powders are characterized by a broad particle size distribution with strongly aggregated particles in the form of agglomerates with a sponge-like aspect, which are difficult to mill since there are strong binding forces between the elementary particles in these aggregates.

In U.S. Pat. No. 4,539,041, the disclosure of which is herein incorporated by reference, the making of metallic powders by a process for reducing oxides, hydroxides or metal salts with the aid of polyols, is described. Particularly when starting with cobalt hydroxide, it is possible to obtain powders of metallic cobalt as essentially spherical, non-agglomerated particles. Further studies have shown in particular that it is possible to obtain non-agglomerated metallic powders having controlled average diameters of the particles, for instance by varying the concentration of the starting hydroxide or metal salt, in relation to the polyol(s). Thus, in the case of cobalt, it is possible to obtain particles with an average diameter of, for instance 1, 2 or 3 μm,, by using the ratios cobalt hydroxide/polyol of 0.033, 0.1 or 0.340 g cobalt/cm$^3$ polyol, respectively. Similarly, it is possible to obtain particles with adjustable average dimensions, smaller than 1 μm by seeding the reaction mixture with the aid of very fine metallic particles (for instance palladium) either by adding a metal salt or hydroxide reacting more quickly than the cobalt salt or hydroxide with the polyol. This is particularly the case with silver salts, in particular silver nitrate, which are quickly reduced to metallic silver in the form of very fine particles of which the number is roughly proportional to the quantity of silver introduced into the reaction chamber. The silver or palladium particles so formed serve as seeds for the growth of cobalt particles which are subsequently formed by reduction of the cobalt hydroxide or salt by the polyol. The higher the number of seed particles, the smaller the dimensions of the final cobalt particles. For instance, when using a molar ratio silver/cobalt in the range of $10^{-4}14\ 10^{-2}$, one can obtain cobalt particles having average dimensions that vary from 0.1 to 0.3 μm, and the range can be extended by varying this ratio between $10^{-5}$ and $10^{-1}$ for all the appropriate metals. These various methods for controlling the size of the metallic particles are particularly known and described by M. Figlarz et al, M.R.S. International Meeting on Advanced Materials, Vol. 3, Materials Research Society, pp. 125–140 (1989); F. Fievet et al, Solid State Ionics 32/33, 198–205 (1989); and F. Fievet et al, M.R.S Bulletin, December 1989, pp. 29–34.

OBJECTS, SUMMARY AND ADVANTAGES OF THE INVENTION

It is an object of this invention to avoid or alleviate the problems of the prior art.

It is also an object of this invention to provide an improved process for making cemented carbide bodies by powder metallurgical techniques, the resulting bodies and methods for their use.

In one aspect of the invention there is provided a method of making a sintered body comprising:

mixing powders comprising a hard constituent and a metallic binder of cobalt, nickel and/or iron, said metallic binder comprising non-agglomerated spherical particles having dimensions in the range of from 0.1 to 20 μm pressing the mixed powders into a compact; and sintering the pressed compact.

In another aspect of the invention there is provided a sintered cemented carbide body comprising WC and a binder phase comprising cobalt and/or nickel, said body having a porosity better than A02 and B00, less than 0.5 binder phase lakes per cm$^2$ with a maximum dimension of >25 μm and less than five carbide grains per cm$^2$ with a grain size of more than 5 times the average grain size of the matrix.

It has now been discovered that cobalt powders having the properties of those obtained by the reduction of cobalt hydroxide or a cobalt salt with the aid of polyol, according to U.S. Pat. No. 4,539,041 and the references just mentioned, that is, powders of individual, essentially spherical non-agglomerated particles, can be used as binder phase powder in the manufacture of cemented carbide and that this preparation gives several advantages which are discussed below.

It has been particularly discovered that when using such non-agglomerated cobalt powders, it is possible to obtain in a reproducible way, cemented carbide exhibiting interesting characteristics, in particular, reduced porosity. It is also possible to decrease the milling time for starting mixtures (carbide and binder) without impairing the quality of the final cemented carbide. Acceptable results can be obtained even after a simple blending operation. Alternatively, the degree of milling may be further reduced and the cemented carbide subjected to a hot isostatic pressing process, either incorporated into the sintering process or as a separate operation, giving an increase in the grain size of the hard phase and correspondingly an increase in resistance to thermal cracking.

In addition, it has been discovered that, due to the use of such cobalt powders, it is possible to sinter at temperatures below those which are generally used. This decrease of sintering temperature is interesting not only from an energy point of view, but also because it possibly permits the possibility of adding to the powder mixture other hard or superhard materials (in the form of powders) which cannot normally be used at the temperature required for conventional sintering. Among these other superhard materials, one can note particularly diamond, of which it is known that it starts transforming into graphite in air at a temperature around 800° C. and cubic boron nitride. Alternatively, the sintering temperature may be lowered even further and the cemented carbide subjected to a hot isostatic pressing process, either incorporated into the sintering process or as a separate operation, giving an increased hardness level and a more uniform grain size and binder phase distribution leading to an increase in mechanical strength.

DETAILED DESCRIPTION OF THE PREFERRED EMBODIMENTS OF THE INVENTION

Generally, the cobalt particles used as binder phase according to the invention have dimensions that can vary from 0.1 to 20 μm, preferably from 0.1 to 10 μm,, most preferably from 0.1 to 5 μm. Especially interesting results have been obtained with submicron particles (that is with a size less than 1 μm).

The present invention has thus as an object the use, as at least part of the binder phase, in the preparation of cemented carbide by milling and sintering a mixture of powders with at least one hard material based on tungsten carbide and a binder phase, of at least one powder of cobalt, that is homogeneous as regards the size of the particles, and particularly one powder having an average particle size x (in the range discussed above), of which at least 80% of the particles have sizes in the range x±0.2x, provided the range of variation (that is, 0.4x) is not smaller than 0.1 μm the particles having a particle size no smaller than 0.25 microns. The cobalt powder used in accordance with the invention consists of individual, essentially spherical, non-agglomerated particles.

Such powders can be especially obtained with the polyol reduction which is discussed again below. It is preferable to start with cobalt hydroxide or cobalt acetate.

The cobalt powders obtained by the reduction of cobalt hydroxide with the aid of polyol generally contain a small proportion of carbon (most often less than 1.5% by weight) and oxygen (most often less than 2.5% by weight). These powders can be directly used in the manufacture of cemented carbides.

Generally, according to the present invention the cobalt powder used as the binder in the preparation of cemented carbide will exclusively be a powder as defined above. But it is possible to use such powders in combination with a second cobalt powder exhibiting other characteristics, provided the proportion of the first powder is sufficient for giving the advantages indicated in the preparation of cemented carbide, for instance, a decrease of the sintering temperature. Generally, the first powder represents at least 10%, and preferably at least 50% of the total weight of the cobalt used as binder phase.

In addition, it is possible to use as binder phase a mixture of two or more powders as defined above, these two powders having different average particle dimensions.

It has also been found that the use of cobalt according to the invention is very suitable to adjust the binder content of an already dried cemented carbide mixture. Such an adjustment is not possible with a conventional binder phase powder since the resulting mixture lacks necessary flowability. Adding polyol reduced cobalt does not adversely affect flowability and can even improve it. Thus, a unique 'mother-mix' may be used for producing a variety of cemented carbide grades having different binder phase contents. After the addition of the polyol reduced cobalt, preferably with a particle size of <3 μm, up to the desired content, the mixture is homogenized (e.g., blended) before pressing and sintering.

The starting powder mixture contains cobalt in sufficient proportions for the final cemented carbide to contain 0.1 to 40% by weight of cobalt, and preferably 3 to 25%. It is particularly advantageous in grades with very low contents of cobalt (typically <0.5% ) often referred to as binderless grades.

Sintered cemented carbide bodies based on WC, particularly with a grain size <1.5 μm, manufactured according to the method of the invention has a porosity better than A02 and B100, less than 0.5, preferably less than 0.2, binder phase lakes per cm$^2$ with a maximum dimension of >25 μm and less than five carbide grains per cm$^2$ with a grain size of more than 5 times the average grain size of the matrix.

In the manufacture of cemented carbides where the sintered grain size of the hard phases is fine, i.e., 1 μm or less, it is commonplace to substitute a small amount of other refractory metal carbides for tungsten carbide. The carbides commonly used are those of titanium, tantalum, niobium, vanadium, chromium and hafnium. The effect of these substitutions is to control grain growth of the hard phase during sintering. A side effect is that they inhibit melt formation during sintering with the result that often higher sintering temperatures are needed than would be the case without the substitution to ensure freedom from microporosity and a uniform binder phase (cobalt-rich phase) distribution. The result is to partly negate the advantage of the substitution, leading to a degree of grain growth, recrystallization, of the WC-phase which results in a non-uniform hardness level less than the optimum hardness level and a reduction in mechanical strength. Using the cobalt polyol reduced-powder according to the present invention, the above-mentioned grain growth inhibitors may be excluded. This applies in particular to high pressure anvils for diamond production in which the cobalt-content of the cemented carbide is 5–7 weight-% and WC grain size <1.5 μm. Another example is tools such as drills, microdrills and routers for machining of printed circuit boards and similar composite materials. Such tools have a cobalt content of 3–20 weight-%, preferably 4–12 weight-% and a WC grain size of <1 μm preferably <0.7 μm.

For certain applications where a degree of thermal shock is experienced, for example, hot rolling of steel bar, some mining and highway engineering applications and machining of stainless steel, it is desired that the hard phases should be of relatively coarse grain size, typically greater than 4 μm preferably greater than 6 μm and the cobalt content <10 weight-%, preferably <8 weight-%. A cemented carbide powder to produce such a sintered hard phase grain size must of necessity be relatively lightly milled in order to control the degree of comminution. The result is that the degree of intimate mixing is reduced, and, owing to the coarse particle size, the area available for reaction during sintering to produce a melt is relatively small. Consequently, such cemented carbide powders prove to be difficult to sinter and require high temperatures to approach a fully dense condition. Using the non-agglomerated, spherical cobalt powder of the present invention, dense bodies can be obtained at a lower sintering temperature.

In U.S. Pat. No. 4,743,515, the disclosure of which is hereby incorporated by reference, it has been shown that an increased strength was obtained in sintered bodies of cemented carbide used in tools for rock drilling. The buttons according to this patent have a core consisting of a fine-grained eta-phase $M_6C$ (e.g., $Co_3W_3C$) and/or $M_{12}C$ (e.g., $Co_6W_6C$), embedded in normal alpha (WC) and beta (Co binder) phase structure at the same time as the sintered body has a surrounding surface zone which consists of alpha- and beta-phase in two areas whereas the outer shell is cobalt depleted and the inner part has a high content of binder phase. Surprisingly, it has now been found that cemented carbide bodies manufactured in such a way as described above give a more optimized toughness behavior when cobalt according to the present invention is used in the production of the buttons. The effect is most pronounced for cemented carbide with a cobalt content of more than 10% and less than 25% by weight and preferably 13–20% by weight of cobalt. The mean grain size of the hard constituents is more than 1.5 μm. The same appearance has also been obtained for cemented carbide bodies with mean grain size of alpha-phase (WC) of less than 1.2 μm and a binder content of equal or less than 6% by weight of cobalt. When cobalt according to the invention is used in the sintering/heat treatment procedure, the sintering temperature can be reduced which results in a lower carbon content in the binder phase and a low porosity level. The benefit of this sintering/heat treatment gives a product with a high carbon activity and a fine grain size eta-phase which results in a cemented carbide body with a more pronounced difference in cobalt content in the surface zone between the outer cobalt depleted shell and the inner part rich with cobalt. The cemented carbide produced with the cobalt according to the present invention has a cobalt content with greater difference and reduced width of the shells in the surface zone which leads to higher compressive stresses in the surface zone and has also positive effects on strength and toughness.

The invention has been described above with reference to the manufacture of conventional cemented carbide, i.e., based upon WC and with a binder phase of cobalt. It is evident that the invention also can be applied to the manufacture of articles of other composite materials with hard constituents (borides, carbides, nitrides, carbonitrides, etc.) and a binder phase, based on cobalt, nickel and/or iron, such as titanium based carbonbitride alloys usually named cermets. Said alloys are manufactured by milling powders of carbides, nitrides and/or carbonitrides of mainly Ti but also of other metals from groups IVa, Va and VIa of the Periodic Table (V, Zr, Nb, Mo, Ta, W etc.) together with powders of nickel and cobalt. The mixture is then dried, pressed and sintered as described above for conventional cemented carbide.

The invention is additionally illustrated in connection with the following Examples which are to be considered as illustrative of the present invention. It should be understood, however, that the invention is not limited to the specific details of the Examples.

EXAMPLE 1

A suspension of cobalt hydroxide was added to a mixture of monoethylenglycol and diethylenglycol, while agitating. The suspension, containing about 200 g of cobalt hydroxide per liter, was progressively heated to a temperature of at least 200° C., while being strongly agitated. A solution of silver nitrate was then added to the monoethylenglycol, so that between 0.07 and 0.3 g silver per liter was introduced. The mixture was kept at the same temperature for 2 hours, and was then left to cool to room temperature.

In this way a cobalt powder (reference P1) was obtained with the following properties:
 SEM diameter of the particles: 0.4 μm
 C: 1.36% by weight
 O: 2.23% by weight
The SEM diameter is the average diameter of the particles measured in the scanning electron microscope.
 In addition, the following raw materials were used:
 Tungsten carbide:
  Origin: Eurotungstàne Poudres (France)
  Total carbon: 6.15% by weight
  Free carbon: 0.05% by weight
  Average diameter (Fisher): 0.9 μm
 Tantalum carbide:
  Origin: H. C. STARCK
  Total carbon: 6.81% by weight
  Free carbon: 0.10% by weight
  Niobium: 9.09% by weight
 Cobalt (reference F) obtained by reduction of the oxide with hydrogen according to the conventional process:
  Origin: Eurotungstène Poudres
  Diameter according to Fisher: 1.30 μm
  C: 0.012% by weight
 With the aid of these materials the following mixtures were prepared:
  Cobalt: 3% or 6.5% by weight Tantalum carbide: 0.5% by weight
Tungsten carbide balance The powder mixture (500 g) in each case was obtained by milling in a mill of the "Attritor" type with a capacity of 9 liters, containing 3.5 kg of milling media (balls of cemented carbide with a diameter of 3 mm) turning at 250 turns per minute, in the presence of 200 ml of ethyl alcohol (or acetone) and with the addition of polyethylene glycol (2 g per 100 g of mixture). The powder was milled during 7 or 14 hours and thereafter granulated using a sieve with 120 μm mesh size. The compaction was carried out under uniaxial compaction from two directions, with matrix and punches of cemented carbide under a pressure of 125 MPa. Sintering was performed at 1375°, 1410° and 1450° C. respectively. After sintering, microsections were prepared and the porosity and recrystallization were determined.

The porosity was determined according to the standard ISO 4505 and is expressed with the aid of a scale of increasing porosity from A00 to A08. The recrystallization of tungsten carbide (or general grain growth) was determined by microscopic examination and visual comparison with an internal standard scale (analogous to that of the ISO scale for the porosity) since no standard exists to this day. The results are expressed with a scale going from R1 (quasi-absence of recrystallization) to R5 (very strong recrystallization).

a) Cobalt: 6.5% by weight
Milling: 14 hours
Sintering: 1450° C.
Results:

| Type of cobalt | P1 (Invention) | F (Conventional) |
| --- | --- | --- |
| Porosity | A02 | A03/04 |
| Recrystallization | R2/R3 | R4/R5 | b) Cobalt: 6.5% by weight
Milling: 7 hours
Sintering: 1450° C.

| Type of cobalt | P1 (Invention) | F (Conventional) |
| --- | --- | --- |
| Porosity | A02 | A04 |
| Recrystallization | R2 | R2/R3 | c) Cobalt: 3% by weight
Milling: 14 hours
Sintering: 1375, 1410 or 1450° C.
Results before HIP

| Sintering temperature | 1375° C. | | 1410° C. | | 1450° C. | |
| --- | --- | --- | --- | --- | --- | --- |
| Type of cobalt | P1 | F | P1 | F | P1 | F |
| Porosity | A02 | A08 | A02 | A04 | A02 | A03 |
| Cobalt lakes* | s | N | s | N | s | N | d) Cobalt: 3% by weight
Milling: 14 hours
Results after HIP s = a few
N = numerous
*The average number of cobalt lakes was determined by counting (in an optical microscope) the lakes on ten optical fields at a magnification of 1500 times and taking the average.

The HIP treatment consists in putting the samples sintered during the previous experiment in a HIP furnace at 1350° C. for 2 hours under 100 MPa (atmosphere=argon)

Results:

| Sintering temperature | 1375° C. | | 1410° C. | | 1450° C. | |
| --- | --- | --- | --- | --- | --- | --- |
| Type of cobalt | P1 | F | P1 | F | P1 | F |
| Porosity | A01 | A01 | A01 | A01 | A01 | A01 |
| Cobalt lakes | s | N | O | N | O | N | s = a few
N = numerous
O = none

These tests show clearly, that all other factors being equal, the use of cobalt powder according to the present invention is beneficial in comparison with the use of a conventional cobalt powder since it results in a decrease of porosity and of the number of cobalt lakes.

EXAMPLE 2

Two laboratory scale batches of cemented carbide powder were made using the same batch of tungsten carbide, this batch having an average particle size of about 1 μm as measured by the Fisher sub-sieve sizer method. In grade A, 6% by weight of conventional hydrogen-reduced cobalt powder was added and in grade B, 6% by weight of ultra-fine spherical cobalt powder of the present invention was added. The same small addition of chromium carbide powder was added to each grade. A fairly intense degree of milling was given to each grade by milling 1 kg of powder with 15 kg of milling bodies in a liquid for 13.5 hours in a rotary mill. Compacts were made from the dried cemented carbide powders and sintered, in close proximity with each other, under vacuum at a range of temperatures. Following sintering, microsections were prepared and the porosity levels were assessed by comparison with standard micrographs according to method ISO 4505. The binder phase distribution was assessed by an arbitrary method. The specimens were first etched for 4 minutes at room temperature in Murakami's reagent and examined under an optical microscope at a magnification of 1500×. The average number of "cobalt lakes" present in a field of view was assessed by counting the number observed in 10 fields and dividing the total count by 10. Cobalt lakes are regions of binder phase, typically from 2–10 μm in diameter, which occur when the sintering temperature was inadequate. The results obtained were as follows:

| | Sintering temperature | Microporosity | Co lakes per field |
| --- | --- | --- | --- |
| A | 1450° C. | A02 | 0 |
| B | 1450° C. | A00 | 0 |
| A | 1410° C. | A02 | 4.9 |
| B | 1410° C. | A00 | 0 |
| A | 1360° C. | A08 | >200 |
| B | 1360° C. | A02 | 5.6 |

From the above results it can be seen that the use of the ultra-fine spherical cobalt powder in grade B had a marked effect on the level of microporosity and binder phase distribution, especially at the lowest sintering temperature employed. As well as permitting a lower sintering temperature to be employed, the use of ultra-fine spherical cobalt powder confers an improved degree of tolerance to temperature variations within the sintering furnace.

EXAMPLE 3

Two laboratory scale batches of cemented carbide powder were made using the same batch of tungsten carbide. This batch having a particle size of about 40 μm according to the Fisher sub-sieve sizer method. The true particle size was, however, approximately 15 μm, the higher Fisher value being due to agglomeration. In grade C, 6% by weight of conventional cobalt powder was added and in grade D, 6% of ultra-fine spherical cobalt powder of the present invention was added. No other carbides were added. A 1 kg charge of cemented carbide powder was milled with 5 kg of milling bodies and a liquid for 13.5 hours in a rotary mill. Compacts were made from the dried cemented carbide powders and sintered, in close proximity to each other, under vacuum at a range of temperatures. Following sintering, microsections were prepared and the porosity levels assessed according to the method detailed in ISO 4505. The results obtained were as follows:

| Grade | Sintering temperature | Microporosity |
| --- | --- | --- |
| C | 1520° C. | A02 |
| D | 1520° C. | A00 |
| C | 1450° C. | A06 |
| D | 1450° C. | A02 |
| C | 1410° C. | A08 |
| D | 1410° C. | A02 |
| C | 1360° C. | >A08 |
| D | 1360° C. | A06 |

The above results illustrate that a marked reduction in porosity levels was achieved using ultra-fine spherical cobalt powder. Thus, lower sintering temperatures may be employed and again an improved degree of tolerance to temperature variation within a furnace change is conferred.

EXAMPLE 4

Anvils for the 60 mm diamond production system have been tested according to the performance represented as life length in diamond production. The anvils were manufactured in three different grades of hard metal and marked with random numbers prior to the testing. The performance test was applied in a diamond production plant during "normal" working conditions whereas the results were reported with life lengths in comparison to presently used anvils. All anvils have a core consisting of a small amount (2%) of eta-phase in the structure.

The anvils of grade A were manufactured according to the conventional production route of cemented carbide and were used as a reference in the test. The anvils were produced as described in Example 1 with 6% by weight of conventional hydrogen-reduced cobalt and a small addition of chromium carbide. The sintering temperature was 1450° C. and the cemented carbide had a microporosity of A02. The microstructure did not show any cobalt lakes.

The anvils of grade B had a similar composition as described for anvils of grade A without the chromium carbide content. The anvils were subjected to a hot isostatic pressing process at 4 MPa and 1410° C. instead of standard sintering. No microporosity was obtained in the microstructure and 5.2 cobalt lakes per field were presented from microscopic examination of the cemented carbide. The microstructure was even and no influence of discontinuous or local grain growth could be seen.

The anvils of grade C had a composition according to the present invention as described in Example 1 without the chromium carbide content. The anvils were subjected to a hot isostatic pressing procedure with the same conditions as for the anvils of grade B. The microstructure examination of the cemented carbide did not show any microporosity (A00) or cobalt lakes. The structure was even without any influence of discontinuous grain growth.

The α-phase (WC) in the microstructure of the three grades of anvils had a mean grain size of about 1.2 μm.

The performance results were reported in actual number of pressings per anvil and scaled in a performance ranking. Each hard metal grade was represented by six anvils.

Results:

| | Anvil No | Number of pressings | Performance/Rank |
| --- | --- | --- | --- |
| Grade A: | 1 | 299 | D |
| | 2 | 99 | E |
| | 3 | 50 | F |
| | 4 | 921 | A |
| | 5 | 384 | C |
| | 6 | 50 | F |
| | AVERAGE | 300 | C |
| Grade B: | 1 | 568 | C |
| | 2 | 289 | D |
| | 3 | 270 | D |
| | 4 | 580 | C |
| | 5 | 602 | B |
| | 6 | 430 | C |
| | AVERAGE | 456 | C |
| Grade C: | 1 | 702 (still in use) | B |
| | 2 | 1399 | A |
| | 3 | 608 | B |
| | 4 | 592 | C |
| | 5 | 820 | B |
| | 6 | 906 | A |
| | AVERAGE | 837 | B |

The results of grade A were uneven and the anvils with the low numbers of pressings had cracks in the top of the anvils. Grade B had a better performance but got the same ranking level as grade A. Three anvils had small cracks in the top surface. Grade C had the best performance ranking in the test and the best pressing behavior of all anvils. Obviously the anvils according to the invention had the most optimized hardness and toughness behavior due to a well dispersed cemented carbide matrix and a narrow grain size distribution of α-phase.

EXAMPLE 5

A coarse-grained tungsten carbide with a grain size of 18 μm in the as-supplied state was used to produce test batches of very coarse cemented carbide for concrete and asphalt cutting tools.

Cemented carbide with low cobalt content and very coarse grain size is needed to achieve optimum combination of toughness to wear resistance properties together with maximum thermal fatigue crack resistance.

The same procedure as in Example 3 was used except for that the milling time was reduced to 9.5 hours.

Grade X was produced with 6% of conventional cobalt and grade Y with 0.3 μm of ultra-fine spherical cobalt powder. Sintering was performed at 1520° C. in vacuum. Grade X showed a porosity level of A06, B06 plus 8 pores of 25 μm, and had to be HIP'd. Grade Y was fully dense with maximum porosity of A02, due to the effective and uniform reduction of the WC grains together with excellent mixing of the spherical cobalt with the tungsten carbide grains.

The metallographical analysis showed as follows:

|  | Grade X | Grade Y |
| --- | --- | --- |
| Grain size mean value | 7 ± 4 μm | 7 ± 1.5 μm |
| maximum size | 18 μm | 10 μm |
| minimum size | 1.8 μm | 5 μm |
| structure | uneven with 10–15 cobalt lakes of 10–20 μm | even |
| hardness (HV3) | 1215 | 1205 |

Road planing tips were made from the two test batches and were compared with a conventional grade, Z with 8 w/o Co, 5 μm WC grains and a hardness of 1200 HV3. Point attack tools from the three grades were made, and they were geometrically identical with the carbide tips (9 mm, length 18 mm with a conical top) brazed at the same time.

The test was made in hard concrete with an Arrow CP 2000 road planing machine.

Drum diameter: 1 m; drum width: 2.2 m

Toolpick speed: 2.0 m/s; cutting depth: 25 mm 180 tools, 60 per grade, were evenly distributed throughout the drum.

Test result (mean value of 50 tools)

| Grade | Wear mm height reduction | Fractured carbide (no of pcs) | Rank |
| --- | --- | --- | --- |
| X | 5.3 | 8 | 2 |
| Y | 4.8 | 1 | 1 |
| Z | 8.1 | 7 | 3 |

EXAMPLE 6

Buttons for roller bits with diameter 12 mm having a multiphase structure were produced from a small production batch. The average particle size of the WC was 3.5 μm and the nominal cobalt content was 13.5% by weight. The added cobalt was ultra-fine spherical cobalt powder of the present invention with a Fisher grain size of 0.3 μm. Compacts of the cemented carbide powder were sintered at 1340° C. Corresponding buttons were produced with the same production process parameters except for the sintering temperature which was 1380° C. These buttons originating from a cemented carbide powder blending with conventional cobalt powder with a Fisher grain size of 1.4 μm. All buttons were thermally treated in a carburizing atmosphere for 2 hours. In the following examination of the microstructure of buttons from the two batches, it could be seen a multiphase structure with a core that contained eta-phase surrounded by a surface zone of a cemented carbide free of eta-phase having a low content of cobalt at the surface and a higher content of cobalt next to the eta-phase "core".

Microprobe studies of the microsections gave the following results:

Grade A (with ultra-fine cobalt):
  Eta-phase core (5.0 mm)
    mean grain size of eta-phase: 4.1 μm
    mean cobalt content: 11.5 weight-%
  Cobalt "rich" zone (width 1.5 mm)
    mean cobalt content: 14.2 weight-%
  Cobalt "depleted" zone (width 2.0 mm)
    mean cobalt content: 10.0 weight-%
Grade B (according to prior art with conventional cobalt)
  Eta-phase core (7.0 mm)
    mean grain size of eta-phase: 4.8 μm
    mean cobalt content: 11.5 weight-%
  Cobalt "rich" zone (width 1.0 mm)
    mean cobalt content: 15.3 weight-%
  Cobalt "depleted" zone (width 1.5 mm)
    mean cobalt content: 8.7 weight-%

No porosity could be seen in the surface zone. It is obvious that buttons prepared according to the invention gave a more distinct multi-phase structure with a higher cobalt gradient in the surface zone.

EXAMPLE 7

Wear and toughness tests were performed with roller bits in an open-cut copper mine. The roller bits were of type 9 ⅞" CS consisting of three roller cones with spherical buttons. The diameter of the buttons was 12 mm. For one roller bit, the buttons according to the invention were placed in all positions of the buttons in row 1. Three types of roller bits were used in the test.

Bit A: Buttons according to Example 6 were placed as above and in the excepted positions, comparative buttons with the same composition according to the prior art.

Bit B: Comparative buttons of Example 6 according to prior art in all positions.

Bit C: Standard cemented carbide with the same composition as in Example 6 but being free of eta-phase and without the multi-phase structure.

Drill rig: 1 pce. BE 45R

Feed: 0–60000 lbs.

Rpm: 60–85

Hole depth: 18–20 m

Type of rock: Biotite gneiss, mica schist.

Results:

| Grade | Drilled Meters | Index | Drilling Depth (m/h) | Index |
| --- | --- | --- | --- | --- |
| A | 1900 | 160 | 18 | 140 |
| B | 1650 | 140 | 16 | 120 (prior art) |
| C | 1170 | 100 | 14 | 100 (prior art) |

The grade according to the invention has obtained longer life length as well as greater drilling rate.

The wear of the buttons was measured at 800 drilled meters.

Results:

| Grade A: | Row 1: | Buttons according to the invention Average wear 3.0 mm |
| --- | --- | --- |
|  | Row 2: | Average wear 2.8 mm |
|  | Row 3: | Average wear 2.5 mm |

The wear profile gave a self-sharpening effect due to a wear looking like "egg shells". The effect was most marked at row 1. One button was missing in row 1.

| Grade B: | Row 1: | Average wear 3.2 mm |
| --- | --- | --- |
|  | Row 2: | Average wear 2.8 mm |
|  | Row 3: | Average wear 2.4 mm |

The wear of the buttons was of "egg shells"-type. From row 1 three buttons from one roller cone and two respectively one from the other two were missing. Two buttons were missing in row 2.

| Grade C.: | Row 1: | Average wear 3.6 mm |
| --- | --- | --- |
| | Row 2: | Average wear 3.0 mm |
| | Row 3: | Average wear 2.6 mm |

From row 1 five buttons from one roller cone and four respectively one from the other two were missing. The penetration rate was slow at 800 drilled meters.

This test gave surprisingly good results for the roller bit attached with buttons made according to the invention. The penetration of the roller bit was also very good.

EXAMPLE 8

From a 91.5:8.5 WC (2 µm)/Co (1.2 µm) powder mixture, granules (hereafter referred to as basic granules) were prepared according to the conventional technique. Then a sufficient amount of cobalt (polyol-type 1 µm) was added to the granules until the respective proportions of WC/Co reached 88:12. After mixing for 30 minutes in a Turbula-type mixer, the resulting mixture ('modified granules') was tested for flowability according to ISO 4490 with the following results:

| | Time/100 g, s |
| --- | --- |
| Basic Granules | 53 |
| Modified Granules | 46 |

After compaction and sintering, a cemented carbide was prepared with the basic granules and the modified granules. The Vickers hardness was determined with the following result:

| | HV50 |
| --- | --- |
| Basic Granules | 1455 |
| Modified Granules | 1300 |

As expected, the hardness of the cemented carbide with the modified granules is lower than that of the basic cemented carbide in view of the higher cobalt content. The structure, however, of the carbide obtained with the modified granules is satisfactory.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A sintered cemented carbide body comprising a WC matrix and a binder phase comprising cobalt and/or nickel, said body having a porosity better than A02 and B00, less than 0.5 binder phase lakes per $cm^2$ with a dimension of >25 µm and less than five carbide grains per $cm^2$ with a grain size of more than 5 times an average grain size of the matrix.

2. The sintered cemented carbide body of claim 1, wherein the said sintered body comprises WC with a grain size >4 µm and <10 weight-% cobalt.

3. The sintered cemented carbide body of claim 1, wherein the said sintered body comprises WC with a grain size <1.5 µm and 5–7 weight-% cobalt.

4. The sintered cemented carbide body of claim 1, wherein the said sintered body comprises WC with a grain size of <1 µm and a cobalt content of 3–20 weight-%.

5. The sintered cemented carbide body of claim 3, comprising an anvil for the high pressure synthesis of diamond.

6. The sintered cemented carbide body of claim 2, comprising a tool for hot rolling of steel bar, mining and highway engineering applications or machining of stainless steel.

7. The sintered cemented carbide body of claim 4, comprising a tool for machining of printed electronic circuit boards.

\* \* \* \* \*